(12) United States Patent
Tsern et al.

(10) Patent No.: US 10,084,644 B2
(45) Date of Patent: Sep. 25, 2018

(54) PORTABLE UNIVERSAL PERSONAL STORAGE, ENTERTAINMENT, AND COMMUNICATION DEVICE

(71) Applicant: Google LLC, Mountain View, CA (US)

(72) Inventors: Ely Tsern, Los Altos, CA (US); Megan Tsern, Los Altos, CA (US); David Mooring, Los Altos Hills, CA (US); Michael Mooring, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 920 days.

(21) Appl. No.: 14/060,572

(22) Filed: Oct. 22, 2013

(65) Prior Publication Data

US 2014/0052834 A1      Feb. 20, 2014

Related U.S. Application Data

(63) Continuation of application No. 12/179,176, filed on Jul. 24, 2008, now Pat. No. 8,595,336.
(Continued)

(51) Int. Cl.
*H04L 12/24*     (2006.01)
*G06F 9/52*      (2006.01)
(Continued)

(52) U.S. Cl.
CPC .......... *H04L 41/0813* (2013.01); *A63F 13/26* (2014.09); *A63F 13/327* (2014.09); *A63F 13/92* (2014.09); *G06F 9/52* (2013.01)

(58) Field of Classification Search
CPC ............... H04W 74/04; H04L 41/0803; H04L 41/0813; G06F 9/52; A63F 13/26; A63F 13/31; A63F 13/327; A63F 13/92
See application file for complete search history.

(56) References Cited

U.S. PATENT DOCUMENTS 5,605,505 A * 2/1997 Han .................. A63F 13/06
                                                    463/39
5,987,376 A    11/1999 Olson et al.
(Continued)

FOREIGN PATENT DOCUMENTS

KR    10-2000-0018155 A    4/2000
KR    10-2005-0082597           8/2005
(Continued)

*Primary Examiner* — Jenee Holland
(74) *Attorney, Agent, or Firm* — McDonnell Boehnen Hulbert & Berghoff LLP (57) ABSTRACT

A method for synchronizing configuration states of a portable device across a plurality of computing platforms comprises associating a plurality of computing device platforms in a plurality of computing device types with a plurality of synchronization protocols; identifying a type of first computing device via a network; identifying a synchronization protocol associated with the computing device platform in the identified computing device; sending a configuration state from the portable device to the first computing device according to the identified synchronization protocol, and updating the configuration state according to user input on the first computing device; receiving an updated configuration state from the first computing device; translating the updated configuration state to a data format used by a second computing device platform in a second computing device; and storing the updated configuration state and the translated updated configuration state on the portable device.

21 Claims, 6 Drawing Sheets

Related U.S. Application Data (60) Provisional application No. 61/025,728, filed on Feb. 1, 2008.

(51) Int. Cl.
*A63F 13/26* (2014.01)
*A63F 13/92* (2014.01)
*A63F 13/327* (2014.01)

(56) References Cited

U.S. PATENT DOCUMENTS

| | | | |
|---|---|---|---|
| 6,039,648 A | 3/2000 | Guinn et al. | |
| 6,311,209 B1 | 10/2001 | Olson et al. | |
| 6,314,483 B1* | 11/2001 | Goto | A63F 13/12 361/679.4 |
| 6,315,668 B1 | 11/2001 | Metke et al. | |
| 6,322,450 B1* | 11/2001 | Nakano | A63F 13/12 463/40 |
| 6,346,048 B1 | 2/2002 | Ogawa et al. | |
| 6,361,440 B1 | 3/2002 | Ogawa et al. | |
| 6,560,636 B2 | 5/2003 | Cohen et al. | |
| 6,579,185 B1* | 6/2003 | Honda | A63F 13/12 463/43 |
| 6,682,423 B2 | 1/2004 | Brosnan et al. | |
| 6,722,989 B1* | 4/2004 | Hayashi | A63F 13/10 434/167 |
| 6,875,110 B1 | 4/2005 | Crumby | |
| 6,884,174 B2 | 4/2005 | Lundy et al. | |
| 6,951,516 B1 | 10/2005 | Eguchi et al. | |
| 7,097,559 B2 | 8/2006 | Okita et al. | |
| 7,154,862 B2 | 12/2006 | Krzyzanowski | |
| 7,574,493 B2 | 8/2009 | Hutcheson et al. | |
| 7,613,835 B2 | 11/2009 | Sato | |
| 7,640,297 B2 | 12/2009 | Obata | |
| 7,747,561 B1* | 6/2010 | Gupta | G06F 17/30578 |
| 7,909,694 B2 | 3/2011 | Schugar | |
| 7,931,533 B2 | 4/2011 | LeMay et al. | |
| 2001/0047393 A1* | 11/2001 | Arner | G06F 9/4445 709/216 |
| 2002/0035604 A1 | 3/2002 | Cohen et al. | |
| 2003/0177187 A1 | 9/2003 | Levine et al. | |
| 2003/0212684 A1* | 11/2003 | Meyer | H04L 41/082 |
| 2004/0015573 A1* | 1/2004 | Yuki | H04L 41/0813 709/220 |
| 2004/0083472 A1* | 4/2004 | Rao | G06F 8/65 717/171 |
| 2005/0033829 A1 | 2/2005 | Oommen | |
| 2005/0097618 A1* | 5/2005 | Arling | H04L 12/2805 725/114 |
| 2005/0208967 A1 | 9/2005 | Buniatyan | |
| 2006/0014547 A1 | 1/2006 | Walter | |
| 2006/0030408 A1 | 2/2006 | Kiiskinen | |
| 2006/0111183 A1* | 5/2006 | MacIver | A63F 13/10 463/36 |
| 2006/0163358 A1* | 7/2006 | Biderman | H04L 67/1095 235/472.01 |
| 2006/0189388 A1 | 8/2006 | Hartman et al. | |
| 2006/0239244 A1* | 10/2006 | Hurst | H04L 12/10 370/352 |
| 2007/0010328 A1* | 1/2007 | Yokota | A63F 13/12 463/42 |
| 2007/0016362 A1* | 1/2007 | Nelson | G01C 21/362 701/425 |
| 2007/0044071 A1* | 2/2007 | Hayles | G06F 8/38 717/113 |
| 2007/0044072 A1* | 2/2007 | Hayles | G06F 8/35 717/113 |
| 2007/0260751 A1* | 11/2007 | Meesseman | G06Q 10/109 709/248 |
| 2008/0108435 A1* | 5/2008 | Nelson | G07F 17/32 463/42 |
| 2008/0126568 A1 | 5/2008 | Otoshi et al. | |
| 2008/0141293 A1 | 6/2008 | Blanchard et al. | |
| 2008/0220878 A1* | 9/2008 | Michaelis | A63F 13/12 463/42 |
| 2008/0228901 A1* | 9/2008 | Choi | H04L 41/0803 709/220 |
| 2009/0104994 A1* | 4/2009 | Rybak | A63F 13/06 463/42 |
| 2009/0124393 A1 | 5/2009 | Tanaka et al. | |
| 2009/0131071 A1* | 5/2009 | Sako | A63F 13/12 455/456.1 |
| 2009/0132720 A1* | 5/2009 | Ruppert | G07F 17/00 709/231 |
| 2009/0172508 A1* | 7/2009 | Karstens | H04N 7/163 715/201 |

FOREIGN PATENT DOCUMENTS

| | | |
|---|---|---|
| KR | 100522454 B1 | 10/2005 |
| TW | 1226254 B | 1/2005 |
| WO | WO-2006/039132 A1 | 4/2006 |

\* cited by examiner

PORTABLE UNIVERSAL PERSONAL STORAGE, ENTERTAINMENT, AND COMMUNICATION DEVICE

CROSS-REFERENCE TO RELATED APPLICATIONS

This application is a Continuation of U.S. patent application Ser. No. 12/179,176, filed on Jul. 24, 2008, which claims priority to U.S. Provisional Patent Application No. 61/025,728, filed on Feb. 1, 2008.

BACKGROUND

Computing platforms, such as personal computers and gaming consoles, represent a wide variety of hardware architectures, software environments, configuration data formats, and communication protocols. While this variety provides a diversity of choices to users, it also presents a challenge with respect to providing a consistent experience to users who regularly use different types of platforms, as well as interactivity between the different platforms.

For example, while a user may play the same game on a game console, on a portable gaming system, and over the Internet on a personal computer, the game experience is in general that of playing three different copies of the same game, and not that of playing one game using three different platforms. Therefore, it is desirable to allow for cross platform synchronization of game states or configuration data states and for providing interactivity between the platforms, thereby providing a consistent experience to the user.

SUMMARY

Embodiments for synchronizing configuration states of a portable device across a plurality of computing platforms comprise associating a plurality of computing device platforms in a plurality of computing device types with a plurality of synchronization protocols; identifying a type of first computing device via a network; identifying a synchronization protocol associated with the computing device platform in the identified computing device; sending a configuration state from the portable device to the first computing device according to the identified synchronization protocol, and updating the configuration state according to user input on the first computing device; receiving an updated configuration state from the first computing device; translating the updated configuration state to a data format used by a second computing device platform in a second computing device; and storing the updated configuration state and the translated updated configuration state on the portable device.

Other aspects are described, in accordance with embodiments of the present invention, such as for providing parental control and for implementing and updating restrictions on availability of device features.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
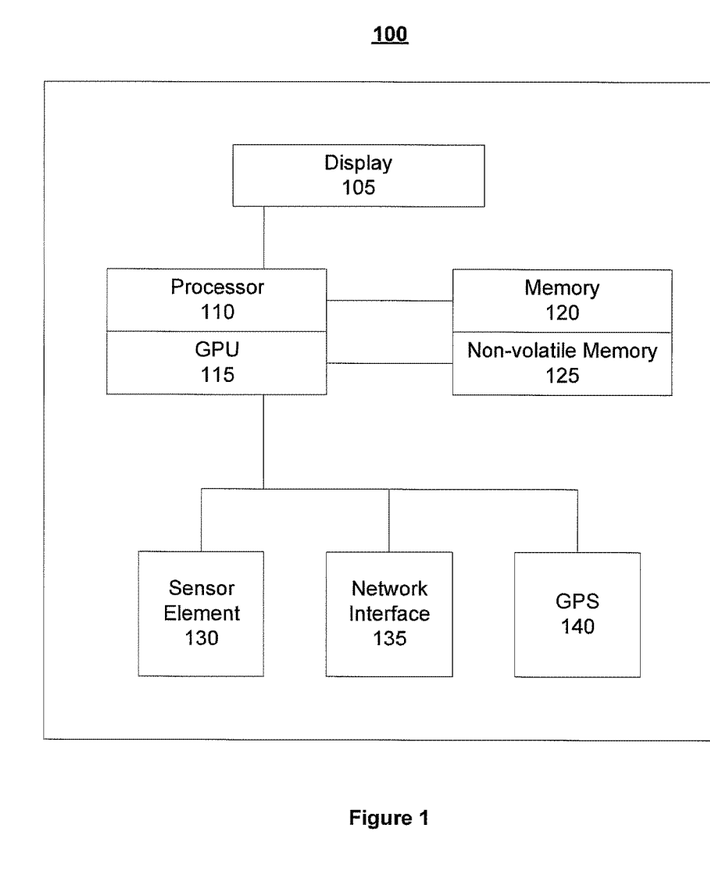
FIG. 1 is a block diagram illustrating a portable electronic data and communication device configured to synchronize configuration states across a plurality of computing.

FIG. 1 is a block diagram illustrating a portable electronic data and communication device (hereinafter also referred to as portable device) 100 configured to synchronize configuration states across a plurality of computing platforms, in accordance with an embodiment of the present invention. Portable device 100 comprises a display 105 coupled to a processor 110. Coupled to the processor 110 are a memory element 120 and a non-volatile memory element 125. Optionally, the processor 110 may comprise a graphics processing unit 115 (GPU) for providing additional computational power for processing and displaying graphics.

Optionally, the portable device 100 may comprise one or more sensor elements 130 coupled to the processor 110. Examples of such sensor elements include, but are not limited to, infra-red (IR) detectors, inertial motion sensors, biosensors, ambient light sensors, or any other sensors. Sensor elements 130 allow the portable device 100 to act as a game controller or other input device that operates individually or together with other game controllers or input devices. In one embodiment, motion sensors on the portable device could monitor physical activity. For example, parents may use such an embodiment to gauge the amount physical activity that their children are engaging in.

The portable device 100 comprises one or more network interface elements 135 coupled to the processor 110. The network interface elements 135 support one or more network wired or wireless protocols and types, such as Bluetooth, WiFi (such as an IEEE 802.11 protocol), Worldwide Interoperability for Microwave Access (WiMAX), Global System for Mobile communications (GSM), General Packet Radio Service (GPRS), Code division multiple access (CDMA), wide area cellular networks such as 3G cellular, various wireless spectra such as 700 MHz, low power protocols such as ZigBee, IR sensing, or any other protocol for communicating over a wired or wireless network. Optionally, the portable device 100 comprises a global positioning system (GPS) element 140, coupled to the processor 110, for sensing a location of the portable device 100.

In one embodiment, the portable device may be implemented as a modular movement that is removably inserted into a receptacle formed into the case of a portable device, such as a watch, for example.

In one embodiment, non-volatile memory element 125 of portable device 100 stores one or more data structures for associating a plurality of computing device types (or individual computing device instances) with one or more synchronization protocols. This allows for synchronization of configuration states across a plurality of computing platforms. The computing platforms may be heterogeneous, with the portable device 100 serving as a device capable of communicating and synchronizing with such a heterogeneous variety of computing devices. As understood herein, the term "synchronization protocol" is interpreted and construed broadly to mean a specific data transfer or exchange protocol used to transfer or exchange configuration state information.

In another embodiment, the non-volatile memory 125 may comprise one or more data structures associating an incoming identifying signal, sent by a computing device in communication with the portable device 100, with a specific synchronization protocol, thereby allowing a computing device to identify its own synchronization protocol to the portable device 100 to allow synchronization between the two devices.

Optionally, a handheld game console may have a receptacle for the portable device 100 to plug into, allowing a game (or other application) to use the processing power of both the portable device 100 and the handheld game console. This provides increased flexibility for the game engine by allowing the engine to concurrently utilize multiple platforms. Similarly, games or applications may be transferred between platforms that way.

Figure 2:
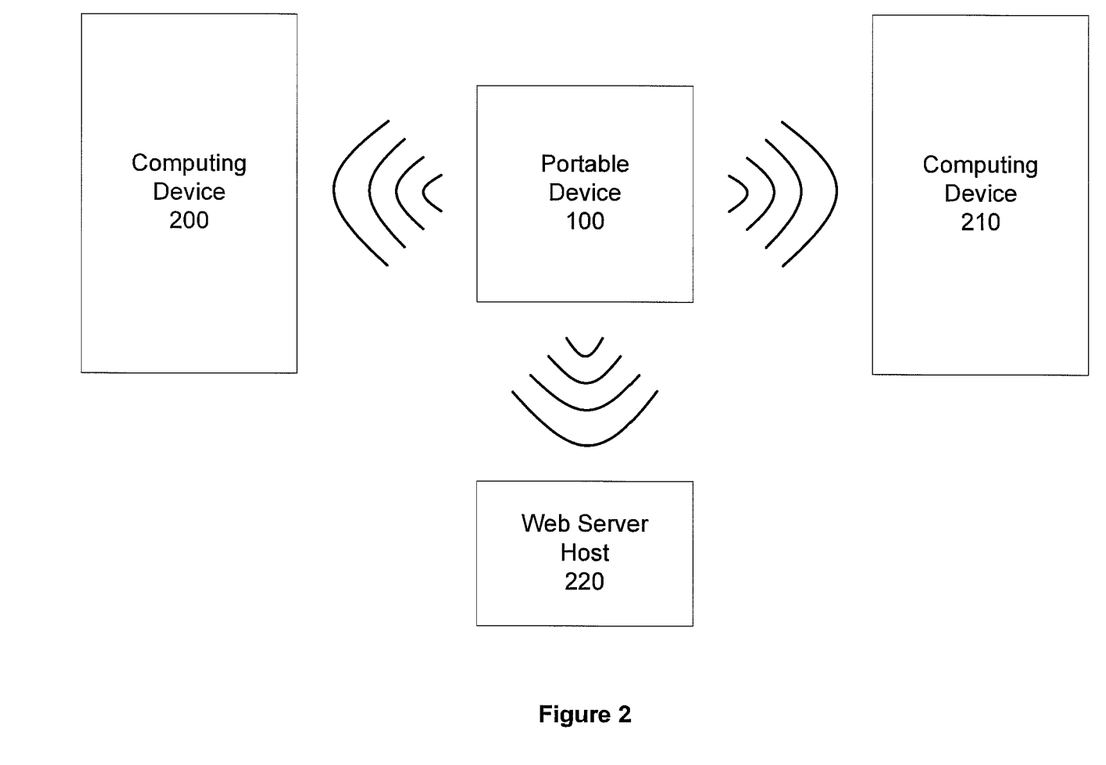
FIG. 2 is a system diagram illustrating a portable electronic data and communication device in communication with one or more computing devices.

FIG. 2 is a system diagram illustrating a portable device 100 in communication with one or more computing devices, in accordance with an embodiment of the present invention. One or more computing devices 200, 210 communicate with the portable device 100 over one or more wireless or wired links, using one or more network protocols. Examples of such computing devices include, but are not limited to, handheld gaming devices, web server hosts, game consoles, cellular phones or other cellular devices, personal computers, set-top boxes, or any other computing device capable of communicating over a network with portable device 100.

Optionally, one or more computing devices 200, 210 may communicate with the portable device 100 using a wireless protocol such as Bluetooth, an IR protocol, wireless local area network (LAN) or wide area network (WAN) protocols, or any other wireless protocol. Optionally the portable device 100 may communicate with a web server host 220 or personal computer through a wired or wireless Internet connection. Computing devices 200, 210 may comprise a game console such as Nintendo™ Wii, Microsoft™ Xbox 360, Sony™ PlayStation, Nintendo™ Game Boy, Sony™ PlayStation Portable (PSP), the Tamagotchi™, or any other game console or device.

In one embodiment, the portable device 100 may act as an extended display of a video game being played on a game console. This display 105 may be used to display information, graphics, or gaming options intended only for that user, such as football play options, or special attack moves options, or secret character selections. The display 105 may have a touchscreen interface allowing users to make simple selections. Game play data, coordinated with the video game being played on the console, may be transmitted to and from the portable device 100 in real-time.

Figure 3:
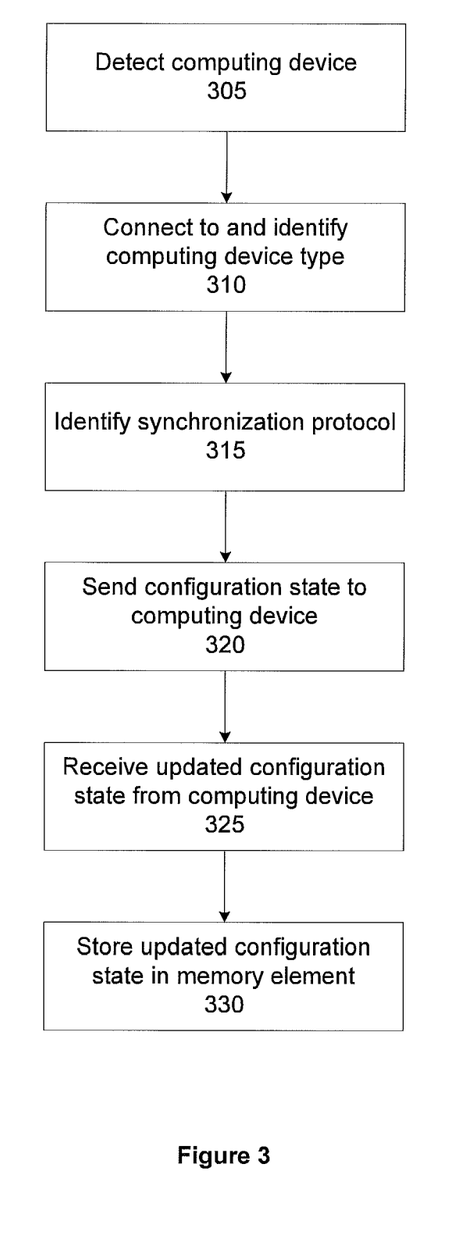
FIG. 3 is a flow diagram illustrating a method for synchronizing configuration states across a plurality of computing platforms in accordance with an embodiment of the present invention.

FIG. 3 is a flow diagram illustrating a method for synchronizing configuration states across a plurality of computing platforms, using the portable device 100, in accordance with an embodiment of the present invention. At step 305, the portable device 100 detects the presence of a computing device 200 on a network. Optionally, the network may be wired, wireless, or comprise any other networking means. At step 310, the portable device 100 connects to the detected computing device 200 and identifies the type of the computing device 200.

In one embodiment, the computing device 200 may be a game console connecting with the portable device 100 over a wireless network. The portable device 100 may use wireless detection and auto-connection with a computing device 200 when the computing device 200 is turned on and the portable device 100 is within wireless range.

At step 315, the portable device 100 identifies a synchronization protocol associated with the type of the computing device 200. The portable device 100 uses the one or more data structures in the memory element 125, as described above, to perform the identification.

At step 320, the portable device 100 sends a configuration state to the computing device 200 using the identified synchronization protocol from step 315. The configuration state may indicate a state of computation on portable device 100, such as an application state, a game state, or any other computation state. In the case of a game state, the configuration state may optionally include billing information, purchase history, accessory download credits, or any other financial information related to the game or game play.

At step 325, the portable device 100 receives an updated configuration state from the computing device 200. This is typically after the computing device 200 has performed some computing (such as game play, application processing, or other computation) and as a result have produced an updated configuration state. At step 330, the portable device 100 stores the updated configuration state in memory element 120 or 125 for further processing or later reference.

In one embodiment the portable device 100 translates the updated configuration state to a data format to be used by a second computing device 210, wherein the first and second computing devices 200, 210 do not share a common configuration state data format. The updated translated configuration state is then stored on the portable device 100, ready to be used by a second computing device 210 upon connecting with the portable device 100.

In an alternative embodiment, the memory element 120 of the portable device 100 need not associate a plurality of computing device types (or individual computing device instances) with a plurality of synchronization protocols. Instead, the portable device 100 may receive the synchronization protocol from the computing device 200 upon connecting with the computing device 200. An advantageous aspect of this embodiment is that portable device 100 need not be pre-configured with the synchronization protocol for synchronizing with computing device 200, but instead receives the appropriate synchronization protocol upon connecting with the computing device 200.

Figure 4:
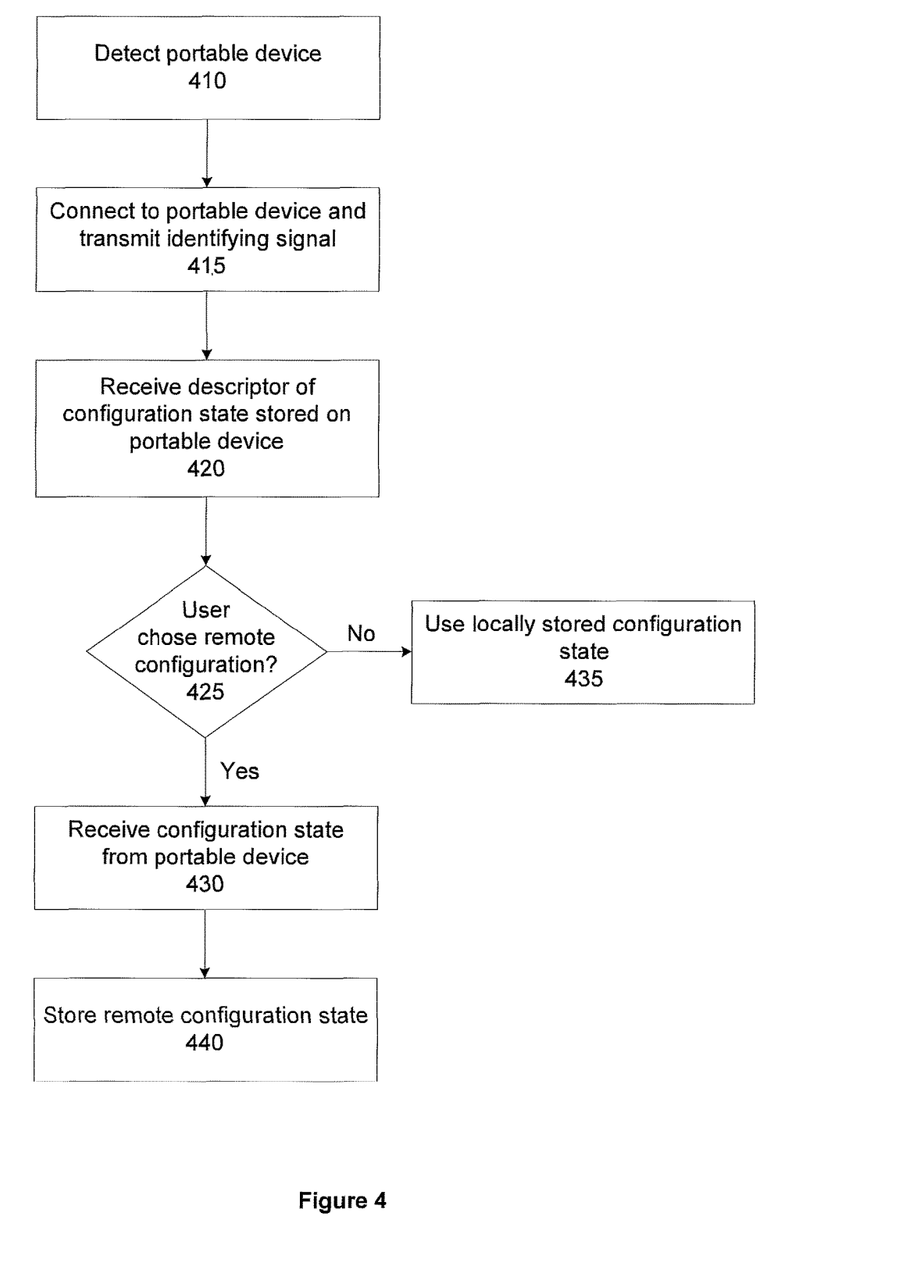
FIG. 4 is a flow diagram illustrating a method for a computing device 200 to synchronize configuration states to a portable electronic data and communication device 100 in accordance with an embodiment of the present invention.

FIG. 4 is a flow diagram illustrating a method for a computing device 200 to synchronize configuration states with a portable device 100, in accordance with an embodiment of the present invention. At step 410, the computing device 200 detects a presence of a portable device 100 in a wired or wireless network. At step 415, the computing device 200 connects to the portable device 100 and transmits a signal identifying the type of the computing device 200 to the portable device 100. Optionally, the computing device 200 first prompts the user to connect to the portable device 100, and only connects when the user chooses to connect. In one embodiment, the computing device 200 is a gaming console in communication with the portable device 100 over a wireless network. At step 420, the computing device 200 receives from the portable device 100 a descriptor of a configuration state stored on the portable device 100, i.e. stored remotely with respect to the computing device 200. In one embodiment, the computing device 200 searches the portable device 100 for one or more such configuration states stored on the portable device 100. In another embodiment, the computing device 200 simply receives one or more such descriptors from the portable device 100, without initiating a search on the portable device 100.

At that point, the computing device 200 presents a user of the computing device 200 with a choice of obtaining the configuration stated remotely on the portable device 100, or continuing to use the configuration state stored locally on the computing device 200. In effect, this allows the user of computing device 200 to choose from a set of configuration states that is distributed and broader that the set of configuration states stored locally on the computing device 200. Note that this is not limited to obtaining configuration state descriptors from only one portable device 100, but extends analogously to any number of remotely stored configuration states that, while not stored locally on the computing device 200, are nevertheless available to the computing device 200 over one or more networks.

At step 425, the computing device 200 receives an input from the user indicating the user's choice of whether or not to obtain a user-selected remote configuration state. If the user input indicates that the user wishes to obtain a user-selected remotely stored configuration state, at step 430 the computing device 200 receives the configuration state from the portable device 100. Otherwise, at step 435, the locally stored configuration state is used by the computing device 200. At step 440, if the remote configuration state was received, the computing device 200 stores the remote configuration state. Optionally, the local and remote configuration states may indicate local and remote game states.

In an alternative embodiment, the portable device 100 may have an auto-synchronization option, where data on portable device 100 is synchronized to the memory on the computing device 200.

Figure 5:
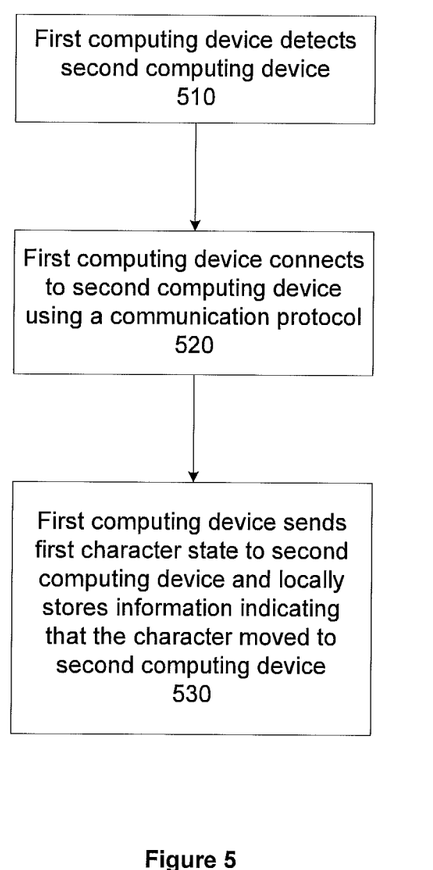
FIG. 5 is a flow diagram illustrating a method for providing a consistent character experience across a plurality of computing devices.

FIG. 5 is a flow diagram illustrating a method for a first computing device, which stores a first character state, to provide a consistent character experience across a plurality of computing devices, in accordance with an embodiment of the present invention. At step 510, a first computing device 200 detects the presence of a second computing device 210. At step 520, the first computing device 200 connects to the second computing device 210 using a communication protocol. Optionally, the first and second computing devices 200, 210 may be game consoles in communication via a wireless network. In a particularly useful embodiment, the computing device is a wireless portable device.

At step 530, the first computing device 200 sends the first character state to the second computing device 210 and locally stores information to indicate that the character has moved to the second computing device 210. In one embodiment, the character state may represent a particular character in a game and the attributes of such character. Examples of such attributes include, but are not limited to, an image, items carried by character, health of character, or any other game character attributes. Further, the updated character state may include billing information, purchase history, accessory download credits, or any other financial information associated with the character.

As described above, a parent (or other person) can purchase and download game credits to the portable device 100 remotely. With game credits, a portable device 100 user may make purchases directly on the portable device 100 on various game or non-game applications that allow direct purchase. The portable device 100 may store many applications, each application possibly linked to different gaming platforms. For instance, a portable device 100 may store applications such as, but not limited to, Nintendo™-based applications, a Club Penguin™ application, a Webkinz™ application, etc. Each of these applications may support direct purchase options, where different characters, character accessories, or games can be purchased and downloaded directly. The parent can track when and what items were purchased by the kids or users of portable device 100. The transaction history may be updated to the portable device 100 when the portable device 100 connects to the Internet.

Game characters may be presented so as to give the illusion that they "live" on different platforms and formats. For example, Pokemon™ characters exist as physical trading cards or toys, but also in different video game platforms, such as Nintendo™ Game Boy, Nintendo™ GameCube, Nintendo™ Wii platforms, the Tamagotchi™, etc. Game characters may also interact on some web portal sites. Game characters exist distinctly and separately, without any coordination or cohesive platform that coordinates the character state between them and unifies the character experience for the user.

In one embodiment, the portable device 100 enables consistent game play over different media. For example, a parent may purchase a Pokemon™ trading card or stuffed toy at department store. The card or toy includes a special access code. The child enters this code on a web server host 220 or into the Pokemon™ video game on a gaming console (such as Nintendo™ GameBoy or Nintendo™ Wii). Using a wireless network, the portable device 100 communicates with the web host server 220 or directly with the game console and receives a character download. The character download includes the character information and character state, and the character is now stored on the portable device 100 memory element 125.

The character now "lives" on the portable device 100. When selected on the portable device 100, the character is animated and moves around the display 105 like a living entity. The character communicates to the user its needs, information the character wants to share, reminders of tasks the user needs to do, etc. The user has options to "care" for the character, similar to a living pet, including feeding the character, providing items or toys, and managing the character. Software on the portable device 100 allows the user to maintain and change the state of the character. The character appears alive and moves around, and can dynamically change and evolve, optionally to the point of having "offspring" or exhibiting other living behavior.

In an alternative embodiment, the first computing device 200 receives an updated second character state from the second computing device 210. The updated second character state typically results from the second computing device 210 updating the first character state of the first computing device 200 according to processing or modification performed on the second computing device 210. Such processing or modification may comprise application processing, game play, or any other computation.

Optionally, a portable device 100 may serve as a "bridge" platform between different game consoles or other types of computing devices to provide a consistent character experience across these platforms. The portable device 100 may be a personal wearable platform, providing the advantage of always being available and easily accessible. Character states may be seamlessly transferred between different gaming platforms. The game character and its state may then be transferred between platforms or different games that support that same character or across the same game that is played on different platforms.

For example, a user may play a Pokemon™ game on a Nintendo™ GameBoy. The Nintendo™ Gameboy uses a wireless link and synchronizes the most recent character information from the portable device 100. When the Pokemon™ game starts, a stored character such as Raichu™ appears on the Nintendo™ Gameboy, with the most recent updated character state from the users' last game on a Nintendo™ Wii.

The user may later want to play the Pokemon™ video game on the Nintendo™ Wii. The user turns on the Nintendo™ Wii, and the Nintendo™ Wii wirelessly detects that the portable device 100 is locally present and asks on the television screen (or other display used by the Nintendo™ Wii) if the user wants to connect to the portable device 100. If the user wants to connect the portable device 100 to the game console, the Nintendo™ Wii searches the local portable device memory element 125 for game state and character information related to the selected video game. The game starts with the user's preferences, previous state, and characters.

The consistent character experience may also include interactions with characters belonging to other users. Such interactions may occur over the Internet through a web server host 220 or locally when two or more portable devices 100 are brought within proximity of each other. Available characters may appear on the user's portable device 100, and the user can approve or reject the interaction. When approved, the character can be simulated to jump out of the portable device display 105 and into the display 105 of the other user's portable device 100. Or in the case of a battle, the other user's character may appear alongside the user's character, so both users may see each character. The character interaction may change the characteristics of the characters, such as strength, endurance, energy, etc., or the characters can exchange or trade items that they own, such as clothes, weapons, spells, special powers, etc.

Optionally, interaction may take the form of exchanging characters between users. The portable device 100 may store software to allow a user to trade characters when communicating with another user's portable device 100. The user may select the "trade" software and users within the same network or Bluetooth range would be listed. The user selects one or more other users and the characters belonging to the other users appear on the display 105. The user's own characters are also displayed on the display 105, and the visual presentation may be organized so as to distinguish the two sets of items (such as one set on the left and the other set on the right hand side of the display 105). Either user may offer one or more items up for trade, for example by dragging the characters from either side of the display 105 to the open middle section of the display 105. A confirm trade button on the display 105 swaps characters to opposite sides, completing the trade.

Once the game ends, the latest updates to the user's preferences, previous state, and characters may be stored back on the portable device 100. For example, the user may play with a Pikachu™ character in a Pokemon™ game, and the Pikachu™ character may gain strength points and evolve into a new character Raichu™.

In an alternative embodiment, the character's state may be modified on the portable device 100 and synchronized over the Internet to a web server host 220. The next time the user plays the game on the web gaming portal, the characters are updated using the character game state from the portable device 100.

The portable device 100 may be configured and controlled to limit access to various functions. This is may be a mechanism for parents to control how and when the portable device 100 is used. The same mechanism also allows a parent to remotely provide new game content or characters to a child's portable device 100.

Figure 6:
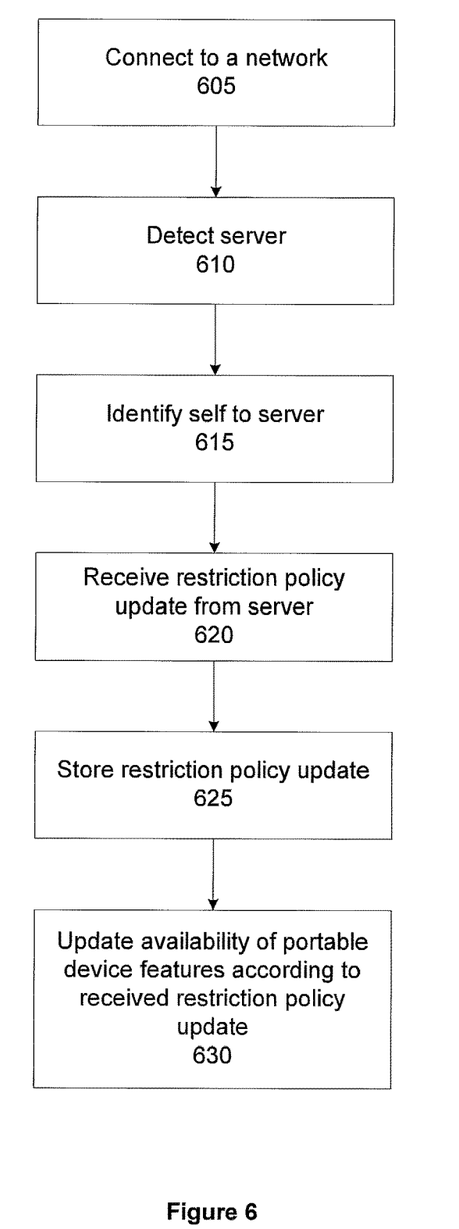
FIG. 6 is a flow diagram illustrating a method for implementing a restriction policy on the availability of features of a portable electronic data and communication device and updating the restriction policy over a network.

FIG. 6 is a flow diagram illustrating a method for implementing a restriction policy on the availability of features of a portable device 100, and for updating the restriction policy over a network, in accordance with an embodiment of the present invention. At step 605, a portable device 100 connects to a network. At step 610, the portable device 100 detects the presence of a web server host 220 or other computing node on the network, the web server host 220 configured to provide one or more restriction policy updates. At step 615, the portable device 100 identifies itself to the web server host 220. At step 620, the portable device 100 receives a restriction policy update from the web server host 220. At step 625, the portable device 100 stores the restriction policy update. At step 630, the portable device 100 updates the availability of portable device features according to the received restriction policy update. Optionally, the portable device 100 updates the display 105 to indicate updated feature availability.

Examples of such restriction policy criteria include, but are not limited to, limits on usage based on where the portable device is located, certain applications restricted by specific scheduled times, certain applications restricted after reaching certain usage time limits, limits on whom the portable device can connect to, or any other restriction criteria.

In one embodiment, a parent logs on to the web server host 220 for the portable device 100. There is a portable device configuration screen allowing the parent to do a restrict access to the certain functions of the portable device 100. The parent may set allowable times when these functions can be enabled or disabled. For instance, the parent configure the portable device 100 to enable the gaming functions outside of school time and only allow the clock function during school hours. Optionally, the portable device 100 may be configured to restrict all the game functions for a week, if the child is grounded.

In an alternative embodiment, the web server host 220 for the portable device 100 could provide information on how the portable device was being used, the amount of time spent using a given program, or the amount of game time used. The parent could set a time limit on the amount of game play or specific game functions, or set time limits on a specific game. In this way, a parent could set global time limits on games that synchronize game or character states with the portable device 100. This time limit can be set across multiple gaming platforms.

Optionally, the portable device 100 may have a feature to allow an authorized central entity within a certain proximity to restrict or defer transactions. For example, in a classroom, a teacher may have some degree of control over the functions of the portable device 100, pursuant to parental settings. Another function of the portable device could allow a teacher to use the portable device 100 for teaching purposes, such as having students respond to questions on it or taking surveys.

In such embodiments, the restriction policy may be automatically updated to the portable device when the portable device 100 is connected to the Internet. The portable device 100 may have wireless Internet access and can perform automatic synchronization updates to the portable device web server host 220, where the latest configuration and data gets transmitted to and from the portable device 100.

Optionally, parents may use the portable device 100 to track their child's location using an optional integrated GPS element 140. The portable device 100 may specify not only a current location of the child, but also a history of the child's location over a specified time period.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

We claim:

1. On a portable device comprising a processor and a memory, a method for synchronizing configuration states across a plurality of computing platforms, comprising:
   associating by data structures in the memory, a plurality of computing device platforms in a plurality of computing device types with a plurality of synchronization protocols;
   identifying a type of a first computing device via a network;
   identifying from a plurality of synchronization protocols, a synchronization protocol associated with a computing device platform of the identified type of the first computing device;
   sending a configuration state from the portable device to the first computing device according to the identified synchronization protocol;
   receiving an updated configuration state from the first computing device, the updated configuration state being based on a selection at the first computing device;
   translating the updated configuration state to a data format used by a second computing device platform in a second computing device; and
   storing the updated configuration state and the translated updated configuration state on the portable device.

2. The method of claim 1 wherein the first and second computing devices do not share a common configuration state data format.

3. The method of claim 1, wherein the portable device is configured to communicate using one of a plurality of network protocols, and wherein each synchronization protocol indicates a network protocol to be used for synchronization.

4. The method of claim 1, wherein the first computing device is a gaming console and the configuration state indicates a game state, and wherein the game state includes billing information, purchase history, or accessory download credits.

5. The method of claim 1, wherein the identifying step comprises using a lookup table associating the plurality of computing platforms with the plurality of synchronization protocols.

6. On a gaming console, a method for synchronizing configuration states to a portable device, comprising:
   identifying a type of the gaming console to the portable device in a wireless range;
   receiving from the portable device a descriptor of a remote configuration state stored on the portable device;
   receiving user input indicating a selection between the remote configuration state and a local configuration state, the local and remote configuration states indicating respective local and remote game states;
   receiving the remote configuration state from the portable device when the selection indicates the remote configuration state; and
   storing the remote configuration state on the gaming console.

7. The method of claim 6, wherein the local game state includes a representation of a first particular character or character attributes of the first particular character in first data format associated with a game played on a first game platform, and the remote game state includes a representation of a second particular character or attributes of the second particular character in a second data format associated with a game played on a second game platform and different than the first data format,
   wherein storing the remote configuration state on the gaming console includes storing the representation of the second particular character or attributes of the second particular character in the first data format for gameplay on the first game platform.

8. A portable device for synchronizing configuration states across a plurality of computing platforms, comprising:
   a memory element storing a data structure associating a plurality of computing device platforms in a plurality of computing device types with a plurality of synchronization protocols; and
   a processor, the processor configured to:
   identify a type of a first computing device via a network;
   identify, from the plurality of synchronization protocols, a synchronization protocol associated with a first computing device platform in the first computing device;
   send a first configuration state from the portable device to the first computing device according to the identified synchronization protocol;

receive an updated configuration state of the first configuration state from the first computing device, the updated configuration state being based on a selection at the first computing device;

translate the updated configuration state to a data format used by a second computing device platform in a second computing device; and store the updated configuration state and the translated updated configuration state on the portable device.

9. The portable device of claim 8 where in the first and second computing devices do not share a common configuration state data format.

10. The portable device of claim 8, wherein the portable device is configured to communicate using one of a plurality of network protocols, and wherein each synchronization protocol indicates a network protocol to be used for synchronization.

11. The portable device of claim 8, wherein the first computing device is a gaming console and the configuration state indicates a game state, wherein the game state includes billing information, purchase history, or accessory download credits.

12. The portable device of claim 8, wherein the identifying step comprises using a lookup table associating the plurality of computing device platforms with the plurality of synchronization protocols.

13. A gaming console for synchronizing configuration states to a portable device, comprising:

a memory; and at least one processor, the at least one processor configured to:

identify a type of the gaming console to the portable device in a wireless range;

receive from the portable device a descriptor of a remote configuration state stored on the portable device;

receive user input indicating a selection between the remote configuration state and a local configuration state, the local and remote configuration states indicating respective local and remote game states;

receive the remote configuration state from the portable device when the selection indicates the remote configuration state; and store the remote configuration state on the gaming console.

14. The gaming console of claim 13, wherein the local game state includes a representation of a first particular character or character attributes of the first particular character in first data format associated with a game played on a first game platform, and the remote game state includes a representation of a second particular character or attributes of the second particular character in a second data format associated with a game played on a second game platform and different than the first data format, wherein storing the remote configuration state on the gaming console includes storing the representation of the second particular character or attributes of the second particular character in the first data format for gameplay on the first game platform.

15. On a portable device implementing a restriction policy on an availability of features of the portable device, a method for updating the restriction policy over a network, comprising:

determining a location of the portable device;

identifying the portable device to a server over the network;

based on the identified portable device, receiving a restriction policy update from the server wherein the restriction policy includes access limitations to device features and functionality based on time of day and device location and wherein the portable device uses the restriction policy to limit device functionality;

storing the restriction policy update on the portable device;

configuring, controlling and limiting access to various functions by a user of the portable device wherein the configuring, controlling and limiting access further comprises providing new content to the portable device;

updating availability of portable device features according to the received restriction policy update; and providing, to the server, information on usage of the portable device and an amount of time spent using a given program.

16. The method of claim 15, wherein the updated restriction policy is schedule based.

17. The method of claim 15, further comprising:

updating a visual display of the portable device to indicate an updated feature availability.

18. The method of claim 15 wherein limiting access to various functions further comprises:

limiting usage based on location of the portable device;

restricting application usage based on specific scheduled times;

restricting application usage after reaching certain usage time limits; and limiting whom the portable device can connect to.

19. The method of claim 15 further comprising at least one of:

setting a time limit on an amount of usage of a specific program associated with the portable device;

setting global time limits on programs that synchronize a game or character states with the portable device; and setting a time limit for a game played across multiple gaming platforms synchronized by the portable device.

20. A portable device that updates restriction policies of a portable device over a network, comprising:

a memory storing a restriction policy on availability of portable device features; and a processor configured to:

determine a location of the portable device;

identify the portable device to a server over the network;

receive a restriction policy update from the server based on the identified portable device, wherein the restriction policy includes access limitations to device features and functionality based on time of day and device location and wherein the device uses the restriction policy to limit device functionality;

store the restriction policy update on the portable device;

receive user input to configure, control and limit access to various functions of the portable device, wherein the received user input further comprises remotely providing new content to the portable device;

update availability of portable device features according to the received restriction policy update; and provide information on usage of the portable device and an amount of time spent using a given program.

21. On a portable device comprising a processor and a memory, a method for synchronizing configuration states across a plurality of computing platforms, comprising:

associating by data structures in the memory, a plurality of computing device platforms in a plurality of computing device types with a plurality of synchronization protocols;

identifying a first computing device, having a first type of computing device platform, via a network;

identifying from the plurality of synchronization protocols, a synchronization protocol associated with the first type of computing device platform in the identified first computing device;

sending a configuration state from the portable device to the first computing device according to the identified synchronization protocol;

receiving an updated configuration state from the first computing device, the updated configuration state being based on a selection at the first computing device;

translating the updated configuration state to a data format used by a second type of computing device platform of a second computing device, the second type of computing device platform being different from the first type of computing device platform; and storing the updated configuration state and the translated updated configuration state on the portable device.

* * * * *